United States Patent

Maillet

[15] 3,649,764

[45] Mar. 14, 1972

[54] VARIABLE BURST LENGTH TDMA SYSTEM

[72] Inventor: Wilfrid G. Maillet, Oxon Hill, Md.

[73] Assignee: Communications Satellite Corporation, Washington, D.C.

[22] Filed: Oct. 15, 1969

[21] Appl. No.: 866,635

[52] U.S. Cl. ..........179/15 BA, 325/4

[51] Int. Cl. ..........H04j 3/00

[58] Field of Search ..........325/4; 343/100 ST; 179/15 AD, 179/15 BA, 15 BS, 15 BY

[56] References Cited

UNITED STATES PATENTS 3,517,312 6/1970 Yamato ..........325/4

*Primary Examiner*—Ralph D. Blakeslee

*Attorney*—Sughrue, Rothwell, Mion, Zinn & Macpeak

[57] ABSTRACT

In a time division multiple-access communications system using a satellite transponder and a plurality of earth stations, each earth station periodically transmits bursts of data which are timed so that the bursts from the earth stations in the system interleave and do not overlap in time when received at the satellite. The total time for transmitting one burst from all stations is the frame time of the system. Each burst is subdivided into numerous time slots or channels during which digital information, such as digitally coded voice communications, is transmitted. All slots or channels which are allocated at any given time to a particular station may be occupied (i.e. the station actually transmits information during the time slot) or only some of the slots may be occupied, depending upon the traffic from the station. Periodically, or in response to actual traffic conditions, each station transmits an indication of its highest numbered channel then in use. The remaining or slack channels for all stations are totaled and divided up equally among all of the operating stations in the frame. Burst movement to accommodate the reallocation of channels is accomplished serially, one burst at a time. Since the slack channels are at the end of the bursts, the nonuse of the slack channels effectively shortens each burst. Burst B moves forward to bunch up against burst A, burst C then moves forward to bunch up against burst B, etc. After the calculations with respect to total slack time have been performed and each station calculates its burst position relative to the reference station to accommodate its new allocation of channels, serial movement of the bursts takes place in a direction away from the reference burst, i.e., the last burst in the frame moves back to the proper position followed by the second to last burst, etc.

10 Claims, 6 Drawing Figures

INVENTOR
WILFRID G. MAILLET

BY Sughrue, Rothwell, Mion, Zinn & Macpeak
ATTORNEYS

VARIABLE BURST LENGTH TDMA SYSTEM

BACKGROUND OF THE INVENTION

With the advent of commercial satellite communications, it was a natural choice to employ for satellites, the same techniques and equipment which have served so well across the decades for terrestrial communications links. However, as satellite technology has progressed, it has become increasingly clear that the conventional frequency division mode of multiple-access (FDMA) operation has a number of disadvantages; major problem areas are in the generation of intermodulation noise in the satellite transponder, the need for accurate uplink power control among network stations, and a general inflexibility of FDMA frequency allocation plans. Alternative approaches to FDMA communications has focused attention on time division multiple access (TDMA) systems in which stations communicate with each other through the satellite by means of nonoverlapping burst transmissions.

In a TDMA system, each earth station transmits one burst of data per frame, a frame comprising one burst from all stations in operation in the system. An important criteria of any TDMA system is the synchronization of bursts so that overlap in the satellite does not occur. One such system for performing burst synchronization is described and claimed in the U.S. patent application of Ova G. Gabbard, Ser. No. 594,921, filed Nov. 16, 1966, now U.S. Pat. No. 3,562,432 entitled "Synchronizer for TDMA Satellite Communication System," assigned to the assignee of the present invention. In the system described in the latter mentioned patent application, each station burst includes a station address code (SAC) uniquely identifying the transmitting station. The SAC word from the reference station initiates down counting of a delay counter which contains a number corresponding to the proper time separation between reference burst and local station burst. If the counter reaches zero at the same time that the local station SAC word is received, that indicates that the local station burst is properly timed. However, if the received local station SAC word is late, the local station burst transmit time should be advanced; if the local station SAC word is early, the local station burst transmit time should be retarded.

Advancement or retardation of the local station burst transmit time is accomplished in response to late or early local station SAC arrivals by slightly altering a counter which controls burst initiation. For example, for a 125-microsecond frame period, and a 50-megabit clock rate, there are 6,250 bits per frame. Under normal conditions, the local station clock pulses are divided by 6,250 (hereinafter referred to as N), resulting in an output pulse once every 125 microseconds. The output pulse serves to initiate the burst of the local station. If the burst is to be retarded, an N+1 gate is energized which forces the burst synchronization apparatus to divide the clock rate by N+1. This has the effect of retarding the burst initiate time one bit or 20 nanoseconds per frame. If the local SAC word arrived late, the system energizes an N−1 gate which forces the clock rate to be divided by N−1, thereby advancing the burst initiate time one bit or 20 nanoseconds per frame. In the manner described in the above-mentioned application, the burst synchronization apparatus operates to continuously maintain the separation between the reference burst and the local station burst at the proper amount determined by the number held in the delay counter.

For a preassignment mode of operation, each station has a fixed number of channels, or time slots, for sending data such as voice information. Under such circumstances, the burst length from any station remains constant. However, a preassignment mode results in situations where one station may have many more channels allocated to it than necessary for certain time periods, whereas another station may not have sufficient channels allocated to it during the same time period.

In a demand assignment mode, the channels are reassigned or reallocated, either periodically or as a result of traffic conditions. One technique for implementing reallocation in a TDMA system is described in the U.S. patent application of William Schmidt, Ser. No. 809,340, filed Mar. 21, 1969, entitled "Channel Reallocation System", and assigned to the assignee of the present invention.

SUMMARY OF THE INVENTION

In accordance with the present invention, reallocation of channels in a TDMA system is accomplished without any burst overlap occurring during the reallocation period. A reallocation marker, which may be sent out periodically by the reference station, causes each station to transmit a number representing its highest numbered channel presently in use. Also, each station does not then fill any channel higher than the number sent out. After each station receives all the numbers from all operating stations, each station calculates the total number of slack channels available in the system, and evenly divides the slack channels among the operating stations.

Since the result of the calculation dividing the slack channels is that each station receives a new allocation of channels, the burst length of each of the stations will have to be changed. Furthermore, as the burst lengths of the various stations are varied, it is necessary that the burst initiation times be moved either forward or backward with respect to the reference burst to accommodate the total changes in burst length. For example, if the reference burst A receives an allocation of five more channels than it initially had, the burst initiate time for burst B will have to move back in time an amount equal to five channels (5 channels × 8 bits/channel × 20 ns./bit = 800 nanoseconds).

In accordance with the present invention, the burst initiate times are adjusted by serially moving the bursts first in a bunch mode and then in a spread mode. Initially, after a station transmits its highest numbered channel during the reallocation period, no higher numbered channels from that station are filled. Thus, if a station, such as station A, has any slack channels, the burst length for that station, during the reallocation period, is shortened. Burst B is the first burst to move and it moves forward an amount equivalent to the slack channels in burst A, in other words, to abut the end of burst A. Next, burst C moves forward an amount equivalent to the sum of slack channels in stations A and B. Next, burst D moves forward an amount equivalent to the sum of the slack channels in bursts A, B, and C, etc. The result is that the bursts are effectively bunched and the last burst is followed by an amount of time corresponding to the total slack channels in the system. After bunching and following calculation of each channel's new position within the burst relative to the reference burst, the spread mode is initiated. The last burst is moved first, followed by the second to last burst, etc. It will be noted that the initiation time of reference burst A does not move within the frame, it only expands or contracts in length.

Actual burst movement is accomplished by inserting into the delay counter of the above-mentioned Gabbard Burst Synchronizer a number equivalent to the proper time separation between the reference and the local station burst. Once this is done, the synchronizer operates in the manner described in the aforementioned patent application to properly position the burst in accordance with said amount in the delay counter.

BRIEF DESCRIPTION OF THE DRAWINGS

FIG. 1 shows a TDMA frame format including five bursts A, B, C, D, and E, from five stations in the system. The entire frame is 125 microseconds long and all bursts are timed with respect to the reference burst A. It should be noted that in accordance with the system to be described herein it is not necessary that it be known in advance which earth station is the reference station. Furthermore, the reason why this flexibility is included in the present invention is because, in actual practice, a given earth station may be initially assigned to be the reference station but that station may go off the air and another station may be made the reference station. Furthermore, reference station failure may occur and a second station will have to be made the reference station. A system for assigning the reference station function to a second station when there is a reference station failure is described and claimed in U.S. patent application to Wilfrid G. Maillet entitled "Reference Station Failure", assigned to the assignee of the present invention, and filed on the same date herewith.

A typical burst format includes a preamble section and a channel information section. The channel information section, for digital voice transmission, is comprised of a plurality of eight-bit channels or slots. Each channel carries a digitally coded voice sample of one conversation. The actual makeup of the channel information section of the burst is not important to an understanding of the present invention. However, it should be noted that the present invention operates on the assumption that once reallocation is initiated, an earth station will not fill one of its slack channels until the reallocation period is finished. Also, the channels are always filled in the order of lowest numbered available channel first (i.e., the available channel closest to the beginning of the burst).

Figure 1:
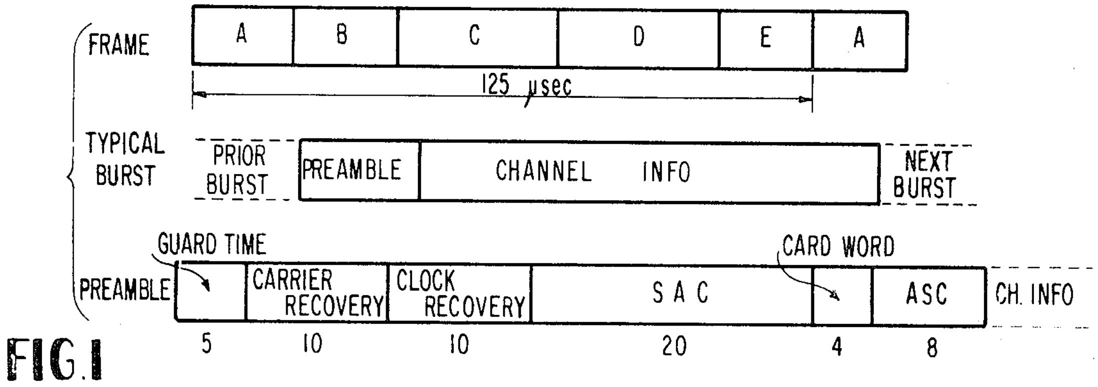
FIG. 1 is a timing diagram illustrating the frame format, burst format, and preamble format for a TDMA system.

The preamble portion of the burst contains all the signaling and data required for network synchronization and operation. The preamble is normally the first portion of a burst to be transmitted and may also be defined as that part of a burst which is not the voice channel information. The preamble format is illustrated in FIG. 1.

The first part of any preamble is the guard time, which is a period of nontransmission deliberately inserted between bursts to prevent their accidental overlapping. Such overlapping could occur because of tolerance variations in the system, uncertainties in the synchronization technique, or simply transients associated with carrier switching. In the system under discussion, the guard time is determined by the burst synchronization technique and the synchronous clocks used by individual terminals; 100 nanoseconds would be adequate for the guard time. Thus, guard time in FIG. 1 is indicated as occupying five bits of time.

The carrier recovery portion of the preamble occupies 200 nanoseconds and constitutes a period of time during which the carrier is transmitted unmodulated. This portion of the preamble is transmitted to aid the receiver to lock onto the carrier frequency and phase. The clock recovery portion of the preamble serves a similar purpose with respect to the system clock. It is used by the receiver to synchronize the bit timing. The next portion of the burst is a 20-bit station address code (SAC) which uniquely identifies the transmitting station.

In order to handle the channel switching and assignment function in the overall system, it is necessary that there be a signaling link or circuit between all stations in the network. Automatic signaling is required since the number of stations and the total number of channels being switched in the network at any one time precludes the use of a first channel request. Stations with low traffic volumes could use manual switching, however, until such time as automatic switching equipment becomes desirable.

The information required in assigning channel links that are fully variable in destination is important since the occurrence of a misrouted channel is to be minimized. The length of the signalling circuit word is 21 bits. Because of the importance of this information and the need for reliable data in this data link, this information is preferably coded for reliability. The use of error detection and retransmission is efficient and reliable with a feedback logic suitable to the multidestinational aspect of the transmissions. The use of a BCH (31,21) code guarantees the detection of any word with four or less bits in error. One dummy bit is added to the 31 bits of coded information to form a 32-bit word.

In order to keep the preamble as short as possible and maintain as efficient a burst as possible, this 32-bit word, called channel allocation and routing data (CARD) is submultiplexed across eight frames at four bits per frame. The initial segment is marked by transmitting the complementary form of the SAC word. Thus, although FIG. 1 shows the CARD word portion of the preamble occupying only four bits, the entire CARD word actually occupies 32 bits but is transmitted four bits per frame and requires eight frames to complete transmission of the CARD word. For the purpose of understanding the present invention, it is only necessary to realize that the CARD word includes a four-bit code referred to as the destination code and a nine-bit channel number code. When transmission is to be sent from station number 1 to station number 2 and channel number 9 is selected to carry transmission, the CARD word from station number 1 includes a four-bit destination code identifying station number 2 as well as a nine-bit channel number code identifying channel number 9. In this manner, when the station number 1 burst is received by station number 2, the latter station knows that it is the addressee of the information carried in channel number 9.

The present invention is not concerned with the apparatus for filling the channels, selecting the channels, or addressing the channels. The above information about the CARD word is included only because the destination slot of the CARD word and the channel information slot of the CARD word are used to initiate reallocation and to identify the last channel number. For example, reallocation could be initiated by the reference station by periodically inserting the code 0000 in the four-bit destination slot of the reference station's CARD word. This could be done, for example, every 3 minutes for the purpose of initiating reallocation. In response to the receipt of the reallocation marker, each local station inserts a MARK last channel number code (1111) in the local station CARD word destination slot and also inserts a number corresponding to the highest or last channel number in use in the nine-bit channel number slot of the local station CARD word. Insertion of the latter information into the CARD word of the local station can easily be accomplished by gating the codes and the number representing the highest channel number into the proper locations of a CARD word register from which the CARD word is extracted and transmitted by the system.

The last portion of the preamble is an eight-bit word called the access service circuit (ASC) which would normally be used as an interstation voice conference line. Its function is of no importance to an understanding of the present invention. The preamble is followed by the channel information.

Figure 2:
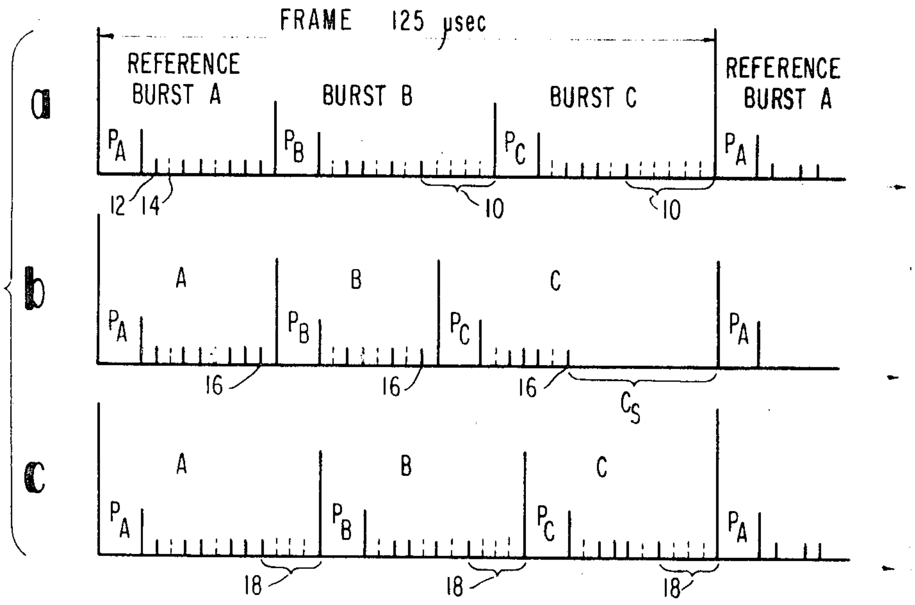
FIGS. 2*a*–2*c* illustrate the manner in which the channels move during the reallocation operation.

FIG. 2 aids in an understanding of the manner in which the bursts move to accomplish reallocation.

In graph a of FIG. 2, there are shown three bursts A, B, and C, occupying the 125-microsecond frame. Each burst includes a preamble section, P, followed by a plurality of allocated channel slots. The presence of a small vertical mark, such as at 12, indicates that the channel slot is occupied. The presence of a small vertical dashed line, such as at 14, indicates that the channel slot is idle. As mentioned above, the overall system channel selection method is to occupy the lowest numbered available channel. Thus, considering the station which transmits reference burst A, if an additional voice channel is to be occupied, channel number 2, indicated at 14, will be selected since it is the first available channel.

The algorithims for moving the bursts during reallocation are as follows:

$$C_s = C_t - \sum_{i=1}^{n} C_i$$

where: $C_s$ is the spare channels in the overall system; $C_t$ is the system channel capacity; $C_i$ is the highest numbered channel in use for the station in the $i$ position of the frame; $n$ is the number of bursts in the frame.

The number of spare channels to be allocated to each station is Q, where:

$$Q=[C_s/n],$$

where $[C_s/n]$ is the largest integer less than or equal to $C_s/n$.

$CM_i=C_i+Q$, where $CM_i$ represents the new maximum number of channels allocated to the station in the $i$th position of the frame.

The new burst positioning can now be calculated by use of the following equations:

$$BB_i=(P)(i-1)+\sum_{j=1}^{i-1} C_j$$

$$BS_i=(P)(i-1)+\sum_{j=1}^{i-1} CM_j$$

where $BB_i$ represents the position of burst $i$ with respect to the frame reference during the aforementioned bunch sequence; $BS_i$ represents the position of burst $i$ with respect to the frame reference during the spread sequence, and $P$ represents the fixed preamble time. $C_j$ is the highest numbered channel in use for the station in the $j$ position of the frame.

In the example shown in FIG. 2, initially burst A has an allocation of eight channels and the highest numbered channel presently in use is the eighth channel. Thus, $C_a$ equals 8. Burst B has an initial allocation of 11 channels and $C_b$ equals 7. Burst C has an initial allocation of 11 channels and $C_c$ equals 6. The total slack channels comprise zero channels in burst A, four channels in burst B, and five channels in burst C. The slack channels are indicated by reference numeral 10 in FIG. 2.

The invention operates to initially move the bursts toward the frame reference to take up the slack caused by the slack channels (sequential bunching) and then to move the bursts away from the reference so that they are properly positioned in accordance with the new allocation of channels.

In the example shown, $C_t$ equals 30 and $C_s$ equals 9. Since reference burst A only expands or contracts, but does not move with respect to the reference marker, burst A is not moved. Since burst A occupies its highest numbered channel available to it, there are no slack channels in burst A and therefore burst B remains in the same position. Burst C moves forward the equivalent of four channels as shown in graph $b$ of FIG. 2. After this movement, a space corresponding to the total slack channels $C_s$ follows the last occupied channel of burst C. The movement of the channels during sequential bunching is controlled by applying the value $BB_i$ to the delay counter of the burst synchronizer of the local station. As described above, the burst synchronizer operates to move the local burst to a position with respect to the reference equal to the number in its delay counter.

Thus, for the example shown in FIG. 2, the burst positions with respect to the reference marker achieved during the bunch sequence are:

$$BB_a=0;\ BB_b=(P)(1)+C_a;\ BB_c=(P)(2)+(C_a+C_b).$$

Since each station receives the data $C_i$ from all of the stations, and furthermore, since each station detects its own position in the burst, each station is capable of calculating $BB_i$ and applying the value $BB_i$ to its respective burst synchronizer at the proper time.

Each station also calculates $C_s$, $Q$, and $CM_i$ for all stations ahead of it in the burst. In the example shown in FIG. 2, $C_s$ equals 9 and $Q$ equals 3. The new allocation of channels to burst A, $CM_a$, is 11; the new allocation of channels to burst B, $CM_b$, is 10; the new allocation of channels to burst C, $CM_c$, is 9. The relative burst times necessary to accommodate the new allocation of channels are:

$$BS_a=0;\ BS_b=(P)(1)+CM_a;\ BS_c=(P)(2)+(CM_a+CM_b).$$

When the $BS$ amounts are applied to the respective delay counters of the burst synchronizers, the bursts, except for burst A, move back with respect to the reference marker (sequential spreading). Burst C moves first followed by burst B. The reason why sequential movement is necessary during bunching and during spreading is to prevent any burst overlap during the period of reallocation. An alternate system for parallel burst movement is described and claimed in the patent application of William Schmidt mentioned above.

Figure 3:
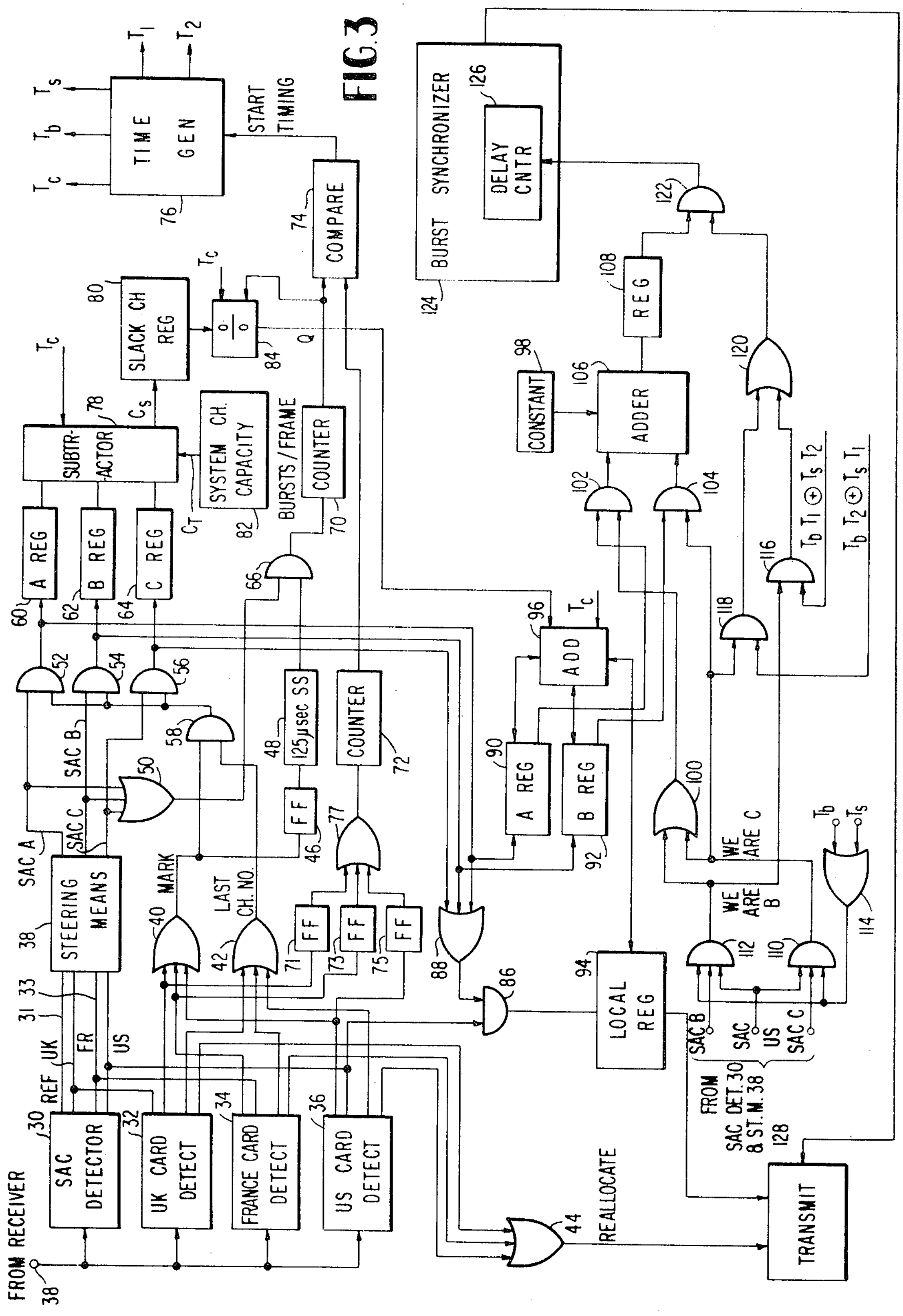
FIG. 3 is a block diagram of a preferred embodiment of the present invention.

The drawing of FIG. 3 illustrates apparatus for reallocating channels in a system having three operating stations. The logic shown in FIG. 3 would appear at one station and identical logic would appear at all other stations. For the purpose of discussing the Figure, it is assumed that there are three stations in the system network which are located in the United States, United Kingdom (UK), and France. It is further assumed that the system is operating with France transmitting the reference burst, i.e., burst A, and the U.S. transmitting the second burst, i.e., burst B. The reallocation apparatus of FIG. 3 represents apparatus at the U.S. location. The data from the station receiver (not shown), which includes the burst data from all stations, appears at terminal 38 and is applied to a SAC detector 30, and CARD detectors 32 through 36. The SAC detector detects the codes representing the SAC words for the U.S., UK and France, and indicates the receipt of such SAC words at corresponding output terminals. The CARD word from the UK burst preamble is entered into the UK CARD detector 32 under control of the UK output from SAC detector 30. An equivalent function is performed to control entry into the France CARD detector 34 and U.S. CARD detector 36. An example of the manner in which the CARD detectors may operate is indicated in the above-mentioned copending application of Wilfrid Maillet. If any of the CARD words contain the code 0000, representing a reallocation initiate code, the card detector corresponding to that word provides an output to OR-circuit 44 which in turn is operable to gate the marker code 1111 into the destination slot of the local station preamble and the last channel number into the channel number slot of the local station CARD word. The gating scheme is not shown in detail as it is apparent how this function could be accomplished. In response to the output from OR-circuit 44, a wired-in code 1111 is gated into the destination slot of a CARD word register and a number representing the highest numbered channel is gated from a highest channel number register to the CARD word register. The content of the CARD word register is transmitted as part of the burst preamble. If manual selection of channels is used, the highest channel number may be manually keyed into the highest channel number register, otherwise it could be loaded automatically.

Upon receipt of the reallocation initiate code, then, each station thus sends out a number representing its highest used channel, $C_i$, along with a MARK channel number code to indicate that the highest used channel is being sent. Each station receives this information from all other stations after it is transponded through the satellite. When the UK CARD detector 32 detects the MARK code 1111, it applies an output to the OR-circuit 40, the output therefrom indicating that the number contained in the portion of the same CARD word allocated to the channel number represents the highest available or last channel number being used by the UK system. This channel number is applied through an OR circuit 42 to an AND-circuit 58. The AND-circuit 58 is gated by the output of OR-circuit 40. Corresponding outputs from the France CARD detector 34 and the U.S. CARD detector 36 are applied to OR circuits 40 and 42 and AND-circuit 58. The result is that each number representing $C_i$ for the various stations is gated through AND-circuit 58 and applied to AND-circuits 52, 54, and 56.

AND-circuits 52, 54 and 56 along with steering means 38 operates to steer each of the last channel number $C_i$ into one of the registers 60, 62 and 64. For example, since the UK burst is in position C, the last channel number from the UK burst should be steered through AND-gate 56 into the C register 64. The steering means 38 receives the SAC indications for the UK, France and the U.S. and also a reference SAC indication. The reference SAC indication occurs in time with the SAC code from the reference station, i.e., the station which occupies burst position A. The particular manner of generating and detecting the reference SAC indication is the subject matter of the above-mentioned Maillet application. It is sufficient for an understanding of the present invention to realize that the reference SAC indication appearing on lead 31 from the SAC detector 30 is the result of a special code in the CARD word of the reference burst. Thus, since France is the reference burst in the assumed example, the reference SAC indication on lead 31 will occur in time with the output on lead 33 indicating the presence of the France SAC word.

The steering means 38 is just a simple logic circuit which steers the UK, France and U.S. inputs to the SAC C, SAC A, and SAC B outputs, respectively. The input arriving in time with the reference SAC indication is steered to the SAC A output, the input arriving next is steered to the SAC B output, etc. Thus, when the France SAC word is detected, an output appears at the SAC A output and energizes gating circuit 52 thereby passing the last channel number, $C_a$, into the A register 60. In the corresponding manner, the last channel numbers $C_b$ and $C_c$, from the United States and the United Kingdom, respectively, are passed into registers 62 and 64.

The outputs from AND-circuits 52 and 54, representing respectively, $C_a$ and $C_b$, are also inserted into registers 90 and 92. It will be noted that there is no register in the latter group of registers corresponding to the C register. This is because the registers in the group comprising 90 and 92 are used to control the burst time to be applied to the burst synchronizer 124. As is apparent from the discussion above, in connection with FIG. 2, the burst position of a station is determined by the burst length of all preceding bursts. Since the C burst in our example does not precede any bursts, it is not necessary that the size of the C burst be taken into account in determining the burst position of any burst in the frame.

An additional register 94 receives the value $C_l$ for the local station, which, in this case, is $C_b$. This is accomplished by applying the U.S. output from SAC detector 30 to an AND-circuit 86. All of the $C_l$ designations from AND-circuits 52, 54 and 56 are applied via OR-circuit 88 to the AND-circuit 86. The output from AND-circuit 86 thus represents $C_l$ for the local station which, in this case, is $C_b$.

A subtractor 78 operates to calculate the total slack channels $C_s$ and to enter the value $C_s$ into a slack channel register 80. The subtractor receives, as one input, the total system channel capacity $C_t$ from a register 82 which stores $C_t$. The subtractor also receives the inputs $C_a$, $C_b$, and $C_c$, from the respective registers 60, 62 and 64, and operates to subtract these latter values from $C_t$, the difference, $C_s$, being stored in the slack channel register 80. The number of slack channels to be allocated to each station is calculated by a divider 84 which receives the input $C_s$ from the slack channel register 80 and the input $n$ from a counter 70. As will be explained hereafter, the counter 70 stores the value $n$ corresponding to the number of bursts per frame. In the specific example described, $n$ equals 3. The output from divider 84 is the whole integer output $Q$ resulting from the division of $C_s$ by $n$.

The manner in which counter 70 determines the proper number $n$ is as follows. When the first MARK channel number code is detected by any one of the CARD detectors 32, 34, or 36, the output from OR-circuit 40 turns on a flip flop 46 which in turn actuates a 125-microsecond single shot 48. The 125-microsecond output pulse from single shot 48 gates the AND-circuit 66 which receives all of the SAC pulse outputs from steering means 38 via OR-circuit 50. Consequently, the SAC pulses for a single frame are counted by the counter 70 at the time the MARK code is received. Flip-flop 46 may be reset by a reset pulse at the end of the calculated time, to be explained hereafter.

Figure 4:
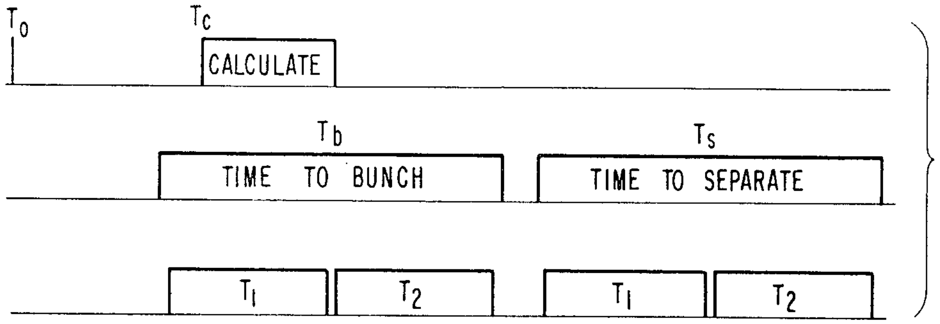
FIG. 4 is a timing diagram illustrating the times of operation of certain apparatus in FIG. 3.

Timing for the three major functions of calculation, sequential bunching, and sequential spreading, is initiated when all of the last channel numbers $C_l$ have been received. The MARK channel indications from CARD detectors 32, 34, and 36 are applied, respectively, to flip-flop circuits 71, 73, and 75. The voltage level transitions on the flip-flop outputs are counted by a counter 72 after passing through an OR-circuit 77. The flip-flops and counter 72 may be reset by the same reset pulse which resets flip-flop 46. The contents of counter 72 will equal the contents of counter 70 when the MARK channel number code from all operating stations has been received. This equality is detected by a compare circuit 74 which provides an output pulse to start the timing of the time generator 76. An example of the timing function for controlling the events is shown in FIG. 4. $T_0$ represents the time at which the timing generator 76 is initiated, $T_c$ represents the time during which calculations are carried out, $T_b$ represents the time during which bunching takes place, and $T_s$ represents the time during which spreading takes place. The time periods $T_b$ and $T_s$ are each further subdivided into smaller time periods $T_1$ and $T_2$. The time periods $T_1$ and $T_2$ control the respective burst movements of bursts B and C during the bunch sequence and bursts C and B during the spread sequence. For a system having only three stations in the network, only two time periods, $T_1$ and $T_2$ are necessary. If the system has more stations in the network, there must be a separate time period for movement of each burst except for the reference burst which never moves.

In general the timing periods $T_1$, $T_2$, etc., which occur during time $T_b$ represent a first series of time periods, whereas the timing periods $T_1$, $T_2$, etc., which occur during times $T_s$ represent a second series of time periods. The burst in the $i$th position will be moved forward during time period $(i-1)$ of the first series of time periods, and will be moved backward during time period $[n-(i-1)]$ of the second series of time periods; where $n$ is the total number of bursts per frame.

In the particular example described herein, during time $T_bT_1$, burst B (U.S.) moves toward the reference; during time $T_bT_2$, burst C moves toward the reference; during time $T_sT_1$, burst C moves away from the reference; during time $T_sT_2$, burst B moves away from the reference. The times for individual burst movement and the overall time to bunch and time to separate are predetermined and sufficient time is allowed to insure that a prior burst has finished movement before the next burst starts its movement. Other important features of the timing arrangement are that the time to separate $T_s$, does not begin until after $T_b$ and after $T_c$. It will be noted that $T_c$, as illustrated, is almost as large as $T_b$ and $T_s$. However, in actual practice the time $T_c$ occupies is insignificant compared to the time $T_b$ and $T_s$ occupy.

As a specific example of times which are suitable, the maximum time required for channel reallocation for three bursts is 700 ms. This number would increase by 40 ms. for each additional burst. The majority of the time required to accomplish channel reallocation is taken up by the time between the reference station sending out a reallocation indication and all stations receiving the last channel number from the last burst in the system. The time it takes for this operation to be completed is 540 ms. (two round trips to the satellite). This time is not illustrated in FIG. 4 since the timing generator 76 is not initiated until the last channel number has been received from all bursts.

During time $T_c$, the subtractor 78, divider 84, and associated apparatus, as well as an adder 96, are controlled to perform their respective functions.

The apparatus for calculating the burst times BB and BS for the local station and for supplying data representing the latter burst times to the burst synchronizer will now be described. The burst synchronizer 124 is shown generally and may be the same as the burst synchronizer described and claimed in the above-mentioned patent application to Ova G. Gabbard. The burst synchronizer is also described in a paper by Mr. Gabbard entitled "Design of a Satellite Time Division Multiple Access Burst Synchronization" appearing in the IEEE *Transactions*

*On Communications Technology*, Volume COM-16, Number 4, Aug. 1968, pp. 589–596. As described in the latter mentioned patent application and publication, and as briefly mentioned above, the quantity held in a delay counter, which is a part of the burst synchronizer, controls the burst time of the local station such that the frame reference and the burst time of the local station are separated by an amount of time equivalent to the quantity stored in the delay counter. A delay counter 126 is illustrated in FIG. 3 as being part of the burst synchronizer 124. The logic shown operates to insert the quantity $BB_b$, representing the bunch burst time for station B, and the quantity $BS_b$, representing the spread burst time for station B, into delay counter 126 at the proper time.

As described above, the registers 90 and 92 initially contain the values $C_a$ and $C_b$. The contents of the latter registers are applied to an adder 106 under control of logic including AND-circuits 102, 104, 112 and 110, and OR-circuits 114 and 100. As can be seen from the logic illustrated, if the local station is the reference station, i.e., transmits burst A, there will be no input to adder 106. No calculation would be necessary since the burst initiate time for the reference station does not change as a result of reallocation. If the local station is burst B, AND-circuit 112 will be energized at the beginning of bunch time $T_b$. The output from AND-circuit 112 passes through OR circuit 100 and energizes AND-circuit 102. The contents of a register 90, $C_a$, is passed to adder 106 wherein it is added to a constant value from the constant register 98. The constant value represents the preamble time and is wired into adder 106 so that each input from any of the registers 90 or 92 is automatically added to the constant value. The output from adder 106, representing the full burst length of burst A for the bunching sequence is stored in register 108. The time at which the contents of register 108 is entered into the delay counter 126 is under control of the logic comprising AND-circuit 122, OR-circuit 120, and AND-circuits 116 and 118. In the example described, the contents of register 108, representing the value $BB_b$, is entered into delay counter 126 at time $T_bT_1$ (i.e., the coincidence of times $T_b$ and $T_1$).

It will be noted that if the local station was in the C position of the burst, the AND-circuit 110 would have been energized at the beginning of time $T_b$, and the contents of registers 90 and 92 would have been applied to the adder 106. The resulting contents placed in register 108, $BB_c$, would have been gated into the delay counter 126 at time $T_bT_2$.

During time $T_c$, the subtractor 78, divider 84, and associated apparatus has operated to generate the output $Q$ representing the number of slack channels to be allocated to each of the bursts. The value $Q$ is added to the values $C_a$ and $C_b$ held in registers 90 and 92, respectively. The resulting sums $CM_a$ and $CM_b$, representing the new maximum channel allocations for bursts A and B, are inserted back into registers 90 and 92. Thus, the earlier contents of these registers are updated by the quantity $Q$. During the time to separate $T_s$, the logic associated with adder 106 and register 108 operates on the quantities held in registers 90 and 92 in the same manner in which it operated upon the quantities in the latter registers during time $T_b$. For the example given, at the beginning of time $T_s$, AND-circuit 112 is again energized thereby causing $CM_a$ from register 90 to be entered into adder 106, added to the constant value from register 98, and inserted in register 108. The contents in register 108, $BS_b$, is gated into the delay counter 126 at time $T_sT_2$. The burst synchronizer 124 provides an initiate signal to the transmitter 128 to start transmission, and the contents of the local register 94, representing the burst length of the local burst, controls the turnoff time of transmitter 128.

In the description given above, the channels were alotted to each station in accordance with the formula:

$$Q=[C_s/n],$$

where $[C_s/n$ is the largest integer less than or equal to $C_s/n$.

However, it should be apparent that the remainder channels could be assigned on an ordered basis by deriving $Q$ in accordance with the following algorithm:

$$Q=[C_s/n]+P,$$

where: $P$=1 if $R-i$ is greater than or equal to 0; $P$=0 if $R-i$ is less than 0; and where $R=C_s-[C_s/n]\,n$.

Applicant's invention is capable of carrying out channel reallocation for a system with many more than the three stations described in the example herein. Also, it will be apparent that the specific individually well-known logic functions described herein can be implemented in many different ways.

What is claimed is:

1. In a TDMA communications system of the type having the following characteristics:

multiple operating stations; each station transmits a burst of data in a nonoverlapping time sequence with respect to the burst from the other stations and receives all station bursts; a complete sequence of one burst from each station makes up the system frame time, the first burst in the frame being a reference burst; each burst includes a preamble identifying the transmitting station and a plurality of information channels allocated to the station, each of which may be filled or not filled with information; and each station has a burst synchronizer which maintains the time separation between the local station burst and the reference station burst equal to an amount dependent upon the quantity in a burst synchronizer delay counter; the improvement comprising, at a local station, a. means responsive to a reallocation code in any received burst for transmitting during the local station bursts, an indication of the last channel presently in use at said local station, those unused channels higher than said last channel being slack channels b. timing means for generating timing pulses representing a first and second series of nonoverlapping time periods, c. means responsive to last channel indications in the received bursts from all stations for altering the contents of said delay counter during a said first series time period dependent upon the position of the local station burst in a frame, to move the local station burst forward an amount of time equivalent to the sum of the slack channels in all preceding bursts in the frame, d. slack channel claculating means responsive to said last channel indications, for calculating a number of slack channels to be allocated to each station, and e. means responsive to said calculated number of slack channels for altering the contents of said delay counter during a said second series time period dependent upon the position of the local station burst in a frame, to move the local station burst backward an amount of time equivalent to the sum of slack channels allocated to all prior bursts by said calculating means, whereby the start times of successive ones of said time periods are separated by a sufficient amount of time to allow complete burst movement and whereby the bursts are moved serially forward starting with the burst nearest the reference and then serially backward starting with the burst farthest from the reference.

2. The apparatus claimed in claim 1 wherein said means for altering the contents of said delay counter during a said first series time period comprises;

a. means for detecting the position of said local station burst within said frame, b. means for calculating the value $BB_i$, where $$BB_i=(P)(i-1)+\sum_{j=1}^{i-1} Cj$$

where $P$ is a predetermined constant proportional to the preamble time of each burst; $i$ is the number corresponding to the position of the local station burst within the frame; $C_j$ is a number proportional to the time occupied by all but the slack channels in the burst in the $j$th position of said frame, and c. gating means responsive to said position detecting means and said timing pulses representing said first series of timing periods for entering said value $BB_i$ into said delay counter during the $(i-1)$ time period of said first series of time periods.

3. The apparatus claimed in claim 2 wherein said means for altering the contents of said delay counter during a said second series time period comprises a. means for calculating the value $BS_i$, where $$BS_i=(P)(i-1)+\sum_{j=1}^{i-1}(Cj+Q),$$

where $Q$ is a number proportional to the time occupied by the slack channels calculated by said slack channel calculating means, and b. gating means responsive to said position-detecting means and said timing pulses representing said second series of timing periods for entering said value $BS_i$ into said delay counter during the $[n-(i-1)]$ time period of said second series of time periods, wherein $n$ is the number of bursts per frame.

4. The apparatus as claimed in claim 3 wherein said slack channel calculating means comprises, a. means responsive to said reallocation code for counting the number of bursts received during a time period equal to said frame period, b. means responsive to received last channel indications for calculating $$C_s=C_t-\sum_{j=1}^{n}Cj,$$

where $C_t$ is a number representing the total channels per frame; $n$ is the number of bursts per frame, and c. dividing means for calculating $Q=C_s/n$, where $Q$ is the number of slack channels to be allocated to each burst.

5. At a local station, the method of adjusting the transmit time of a burst of data to accommodate reallocation of data channels among several stations in a TDMA communications system of the type in which each station transmits one burst of data per frame, each burst containing signaling data and a number of data channels which may or may not be occupied with information, and in which each station receives the bursts from all other stations and synchronizes its own burst transmit time with a reference burst, the method comprising;

a. detecting the presence of a predetermined code in a received burst, b. transmitting during the local station burst, a signal representing the burst time occupied by all said local station data channels up to and including the last data channel occupied with information, c. detecting said burst time signals in all received bursts, d. calculating the total slack time for the entire frame, said slack time for each burst being the burst time occupied by the data channels following said last data channel occupied with information, e. advancing the burst transmit time of said local station burst an amount of time equal to the slack time of all bursts in the frame which precede said local station burst, the step of advancing being accomplished during the $(i-1)$ subtime period of a first time period, wherein $i$ is an integer corresponding to the position of the local station burst in the frame, f. calculating the slack time to be allocated to each of the stations in the system, and g. retarding the burst transmit time of said local station burst an amount of time equal to the total slack time allocated to the bursts preceding the local station burst, the step of retarding being accomplished during the $[n-(i-1)]$ subtime period of a second time period, wherein n is the number of bursts per frame and said second time period follows and does not overlap said first time period.

6. The method as claimed in claim 5 wherein the step of calculating the total slack time for the entire frame comprises a. subtracting amounts represented by said burst time signals from a predetermined number representing the total time per frame allocated to said data channels, the result being the total slack time.

7. The method as claimed in claim 6 wherein the step of calculating slack time to be allocated to each of the stations comprises, a. counting the number of received bursts during a period equal to a frame period, following receipt of said reallocation indication;

b. dividing said total slack time by said counted number of received bursts, the quotient representing the slack channels allocated per station.

8. A method of channel reallocation and burst movement for a TDMA communication system having multiple stations and a TDMA frame format of sequential nonoverlapping transmission bursts, one from each station, and each burst including multiple channels of data, the method comprising:

a. transmitting from at least one station and receiving at all stations a reallocation initiate signal, b. during a first time period following reception of a reallocation initiate signal, sequentially moving forward in time beginning with the first burst subsequent to a reference burst, all bursts but the reference burst an amount of time equivalent to the sum of the slack channels in all preceding bursts, said slack channels corresponding to the consecutive channels at the end of each burst which do not contain data, c. allocating the total of said slack channels among the bursts, and d. during a second time period after said first time period, sequentially moving backward in time, beginning with the burst preceding the reference burst, all bursts but said reference burst an amount of time equivalent to the sum of the slack channels allocated to all preceding bursts.

9. The method claimed in claim 8 further comprising the steps of, a. transmitting from each station, upon receipt of said reallocation initiate signal, a last channel signal representing the highest numbered channel at said station which is presently occupied with data, and b. detecting at each station the last channel signals from all stations.

10. The method claimed in claim 9 wherein the step of allocating comprises a. subtracting quantities represented by said last channel signals from a quantity representing the total channels per frame, b. dividing the result of the subtracting step by the number of bursts in a frame.

* * * * *